US010274052B2

(12) United States Patent
Yamada (10) Patent No.: US 10,274,052 B2
(45) Date of Patent: Apr. 30, 2019

(54) MULTISTAGE TRANSMISSION DEVICE (71) Applicant: SUZUKI MOTOR CORPORATION, Hamamatsu-shi, Shizuoka (JP)

(72) Inventor: Ikuo Yamada, Hamamatsu (JP)

(73) Assignee: SUZUKI MOTOR CORPORATION, Shizuoka (JP)

(*) Notice: Subject to any disclaimer, the term of this patent is extended or adjusted under 35 U.S.C. 154(b) by 449 days.

(21) Appl. No.: 15/019,070

(22) Filed: Feb. 9, 2016

(65) Prior Publication Data
US 2016/0258511 A1 Sep. 8, 2016

(30) Foreign Application Priority Data

Mar. 4, 2015 (JP) ................................. 2015-042537

(51) Int. Cl.
F16H 3/091 (2006.01)
F16H 3/10 (2006.01)
F16H 3/089 (2006.01)

(52) U.S. Cl.
CPC ............. *F16H 3/091* (2013.01); *F16H 3/089* (2013.01); *F16H 3/10* (2013.01); *F16H 2200/0052* (2013.01)

(58) Field of Classification Search
CPC ............. F16H 3/10; F16H 3/091; F16H 3/089
USPC ........................................................ 74/325
See application file for complete search history.

(56) References Cited

U.S. PATENT DOCUMENTS

| 2,792,714 | A | * | 5/1957 | Forster | ...................... F16H 3/10 192/48.7 |
| 4,534,236 | A |  | 8/1985 | Nishikawa et al. | |
| 5,603,241 | A |  | 2/1997 | Umeyama | |
| 8,596,156 | B2 | * | 12/2013 | Clark | ........................ F16H 3/10 477/115 |
| 2010/0218635 | A1 |  | 9/2010 | Matsumoto et al. | |

FOREIGN PATENT DOCUMENTS

| CN | 103982602 | A |   | 8/2014 |
| DE | 69504585 | T2 |   | 10/1998 |
| GB | 700367 |  | * | 12/1953 |
| JP | S61192952 | A |   | 8/1986 |
| JP | 8-4887 |  | * | 1/1996 |
| JP | 2010-249303 |  | * | 11/2010 |
| JP | 5143055 | B2 |   | 2/2013 |

OTHER PUBLICATIONS

Office Action dated Feb. 7, 2018 during the prosecution of German Patent Application No. 10 2016 103 512.2.
Office Action dated Dec. 4, 2018 during the prosecution of Japanese Patent Application No. 2015-042537 (english translation attached).

* cited by examiner

*Primary Examiner* — William C Joyce
(74) *Attorney, Agent, or Firm* — Troutman Sanders LLP (57) ABSTRACT A multistage transmission device includes a plurality of driving gears provided in a countershaft, a plurality of driven gears meshing with the driving gears, respectively, dog rings that switch mechanical connection or disconnection between the drive shaft and each of the driven gears, and one-way clutches arranged between the countershaft and the driving gears. The one-way clutches transmit rotation of the countershaft to the driving gears when the rotation of the countershaft is faster than the rotation of the driving gears.

2 Claims, 8 Drawing Sheets

FIG.4D

MULTISTAGE TRANSMISSION DEVICE

CROSS-REFERENCE TO RELATED APPLICATIONS

This application is based upon and claims the benefit of priority of the prior Japanese Patent Application No. 2015-042537, filed on Mar. 4, 2015, the entire contents of which are incorporated herein by reference.

BACKGROUND OF THE INVENTION

Field of the Invention

The present invention relates to a multistage transmission device employed in a vehicle such as a motorcycle.

Description of the Related Art

An engine mounted in a vehicle such as a motorcycle is equipped with a multistage transmission device. The multistage transmission device has a countershaft that receives a drive force from a crankshaft through a clutch mechanism and a drive shaft that outputs the drive force received from the countershaft. A plurality of gears having different numbers of teeth is provided in both the shafts, and a gearshift operation is performed by changing a gear engagement state thereof.

Patent Document 1: Japanese Patent No. 5143055

As an example of such techniques, Patent Document 1 discloses a multistage transmission in which a plurality of driving gears and a plurality of driven gears are supported about respective gear shafts parallel to each other while they mesh with each other in each gearshift stage at all times. In the technique discussed in Patent Document 1, a gear shift-up operation is performed by engaging a driven transmission gear having a gear reduction ratio smaller by one stage with a shaking pawl member R while the driven transmission gear n is engaged with the shaking pawl member R. Therefore, it is possible to achieve a smooth gearshift operation without a necessity of applying a force in disengagement and without using a gearshift clutch. In addition, there is no loss in a switching time for the shift-up operation. Furthermore, there is no loss of the drive force and little gearshift shock. Therefore, it is possible to achieve a smooth shift-up operation.

However, in the technique discussed in Patent Document 1, an internal structure of the counter gear shaft becomes complicated, and this increases a weight of the transmission mechanism and makes difficult to obtain a compact transmission mechanism.

SUMMARY OF THE INVENTION

In view of the aforementioned problems, it is therefore an object of the present invention to achieve a smooth speed-up operation without complicating an internal structure of the shaft.

According to an aspect of the present invention, there is provided a multistage transmission device including: a countershaft that receives a drive force; a drive shaft that outputs the drive force received from the countershaft; a plurality of driving gears provided in the countershaft; a plurality of driven gears respectively meshing with the plurality of driving gears; a drive shaft-side transmission member that switches mechanical connection or disconnection between the drive shaft and the driven gears; and a one-way clutch arranged between the countershaft and at least predetermined one of the driving gears to transmit rotation of the countershaft to the predetermined driving gear when the rotation of the countershaft is faster than the rotation of the predetermined driving gear.

The multistage transmission device described above may further include: a countershaft-side transmission member that switches mechanical connection or disconnection between the countershaft and each of the driving gears; and a one-way clutch arranged between the countershaft and the countershaft-side transmission member engaged with the predetermined driving gear to transmit rotation of the countershaft-side transmission member to the countershaft when the rotation of the countershaft-side transmission member is faster than the rotation of the countershaft.

In the multistage transmission device described above, in order to perform a shift-up operation from a gearshift stage having a larger gear reduction ratio to a gearshift stage having a smaller gear reduction ratio, the drive shaft-side transmission member temporarily has a state that the drive shaft is connected to a driven gear having a smaller gear reduction ratio while the drive shaft is connected to a driven gear having a larger gear reduction ratio.

DETAILED DESCRIPTION OF THE PREFERRED EMBODIMENTS

A description will now be made for preferable embodiments of the present invention with reference to the accompanying drawings.

Figure 1:
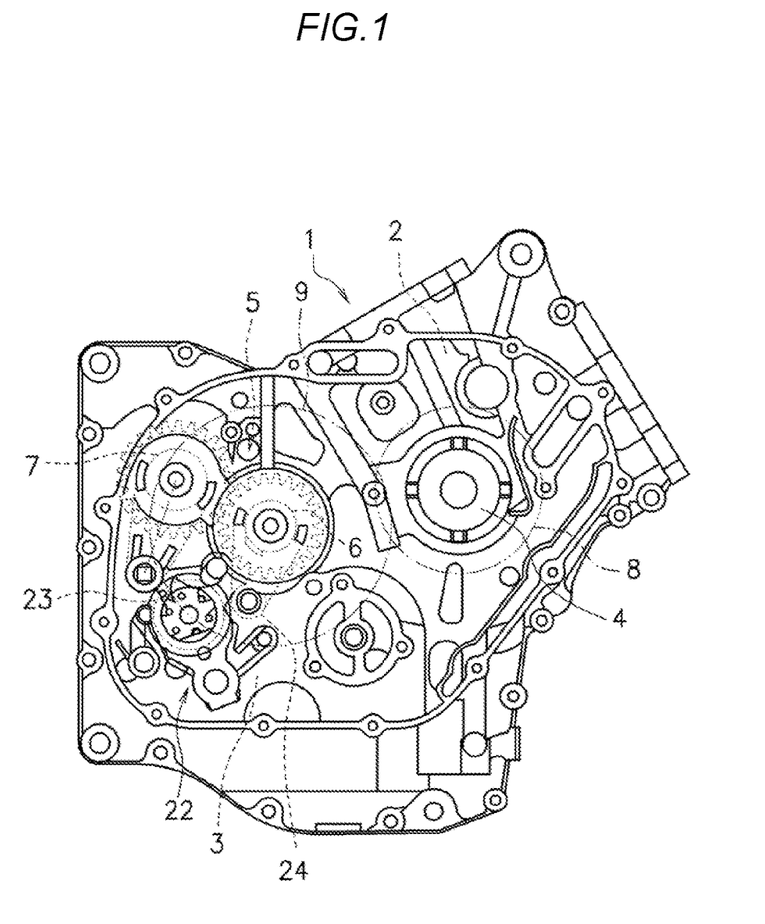
FIG. 1 is a right side view illustrating a crankcase of an engine unit of a motorcycle provided with a multistage transmission device according to the present invention.

FIG. 1 is a right side view illustrating a crankcase 1 of an engine unit of a motorcycle provided with a multistage transmission device according to the present invention. A crank chamber 2 is provided in the front side of the inside of the crankcase 1 (right side of FIG. 1), and a transmission chamber 3 is provided in the rear side (left side of FIG. 1). A crankshaft 4 extending in a vehicle width direction is installed inside the crank chamber 2. In addition, a multistage transmission device 5 is installed inside the transmission chamber 3. The multistage transmission device 5 has a countershaft 6 that receives a drive force from the crankshaft 4 through a clutch mechanism and a drive shaft 7 that outputs the drive force received from the countershaft 6 to a driving wheel (not shown). The countershaft 6 and the drive shaft 7 are arranged in parallel with the crankshaft 4.

A primary driving gear 8 is provided in the right end portion of the crankshaft 4 rotatably in synchronization. In addition, a primary driven gear 9 meshing with the primary driving gear 8 is provided in the right end portion of the countershaft 6 rotatably. The drive force of the crankshaft 4 is transmitted from the primary driven gear 9 to the clutch mechanism via the primary driving gear 8 and is input to the countershaft 6 through the clutch mechanism.

Figure 2:
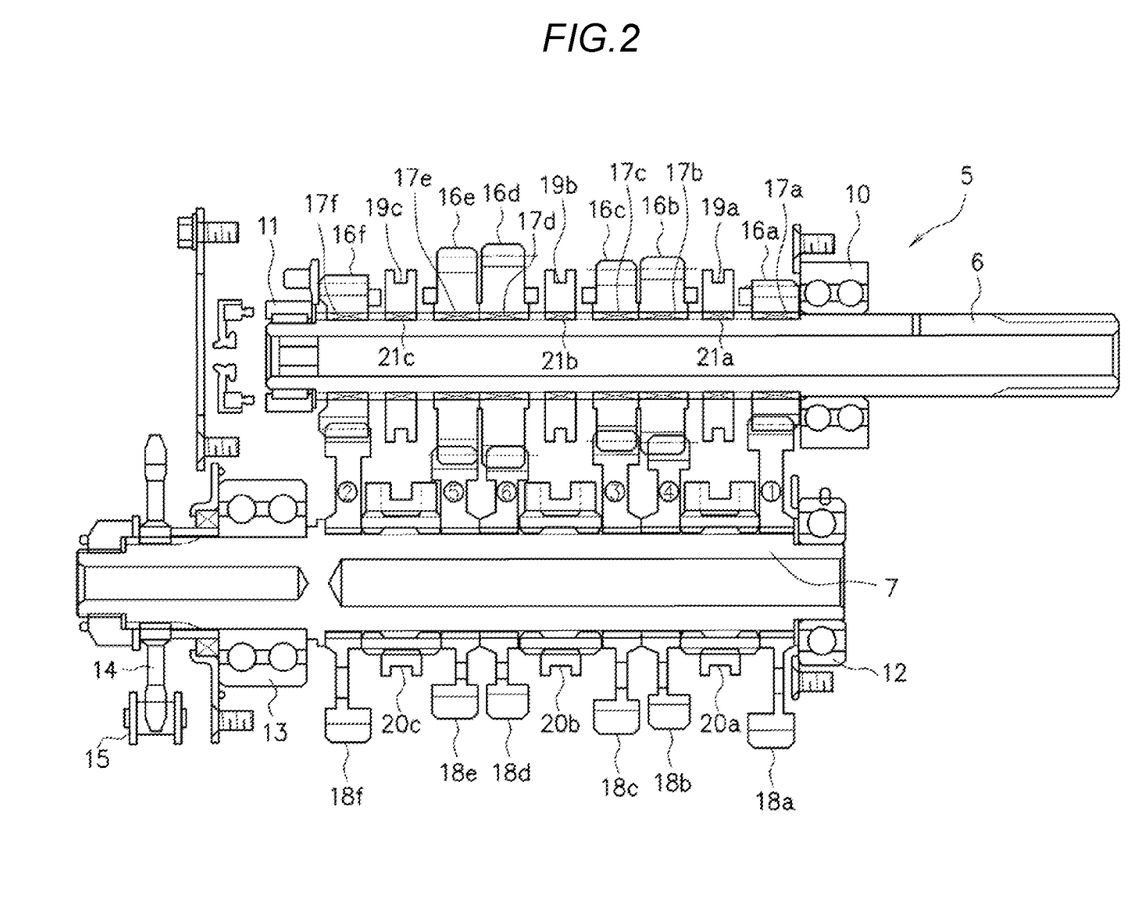
FIG. 2 is a diagram illustrating main parts of the multistage transmission device according to an embodiment of the present invention in a neutral position.

Inside the crankcase 1, the countershaft 6 is rotatably supported by left and right bearings 10 and 11 as illustrated in FIG. 2. In addition, the drive shaft 7 is rotatably supported by left and right bearings 12 and 13. The left end portion of the drive shaft 7 protrudes to the outside of the transmission chamber 3 and is provided with a driving sprocket 14. The driving sprocket 14 is connected to a driven sprocket provided in the driving wheel (not shown) through the drive chain 15, so that the engine drive force is transmitted to the driving wheel by driving the chain.

As illustrated in FIG. 2, the countershaft 6 is provided with a plurality of driving gears arranged along its axial direction. In this example, a 1-speed driving gear 16a, a 4-speed driving gear 16b, a 3-speed driving gear 16c, a 6-speed driving gear 16d, a 5-speed driving gear 16e, and a 2-speed driving gear 16f are arranged sequentially from the right side.

One-way clutches 17a to 17f are arranged between the countershaft 6 and each of the driving gears 16a to 16f. The one-way clutch 17a transmits rotation of the countershaft 6 to the driving gear 16a when the rotation of the countershaft 6 is faster than that of the driving gear 16a. In other words, the rotation of the driving gear 16a is not transmitted to the countershaft 6 when the rotation of the driving gear 16a is faster than that of the countershaft 6. This similarly applies to the one-way clutches 17b to 17f. It is noted that a sprag clutch or a cam clutch may be employed in the structures of the one-way clutches 17a to 17f.

A plurality of driven gears is arranged in the drive shaft 7 along its axial direction. In this example, a 1-speed driven gear 18a meshing with the 1-speed driving gear 16a at all times, a 4-speed driven gear 18b meshing with the 4-speed driving gear 16b at all times, a 3-speed driven gear 18c meshing with the 3-speed driving gear 16c at all times, a 6-speed driven gear 18d meshing with the 6-speed driving gear 16d at all times, a 5-speed driven gear 18e meshing with the 5-speed driving gear 16e at all times, and a 2-speed driven gear 18f meshing with the 2-speed driving gear 16f at all times are arranged sequentially from the right side.

The drive shaft 7 and each driven gear 18a to 18f are rotatable independently.

In the countershaft 6, a dog ring 19a is arranged between the 1-speed driving gear 16a and the 4-speed driving gear 16b. The dog ring 19a serving as a countershaft-side transmission member is slidable along the axial direction of the countershaft 6 and is selectively engaged with the 1-speed driving gear 16a or the 4-speed driving gear 16b to mechanically connect the countershaft 6 to the 1-speed driving gear 16a or the 4-speed driving gear 16b. Similarly, dog rings 19b and 19c are arranged between the 3-speed driving gear 16c and the 6-speed driving gear 16d and between the 5-speed driving gear 16e and 2-speed driving gear 16f, respectively.

One-way clutches 21a to 21c are arranged between the countershaft 6 and each of the dog rings 19a to 19c. The one-way clutch 21a transmits rotation of the dog ring 19a to the countershaft 6 when the rotation of the dog ring 19a is faster than that of the countershaft 6. In other words, the rotation of the countershaft 6 is not transmitted to the dog ring 19a when the rotation of the countershaft 6 is faster than that of the dog ring 19a. This similarly applies to the one-way clutches 21b and 21c. It is noted that a sprag clutch or a cam clutch may be employed in the structures of the one-way clutches 21a to 21c.

In the drive shaft 7, a dog ring 20a is arranged between the 1-speed driven gear 18a and the 4-speed driven gear 18b. The dog ring 20a serving as a drive shaft-side transmission member is slidable along the axial direction of the drive shaft 7 and is selectively engaged with the 1-speed driven gear 18a or the 4-speed driven gear 18b to mechanically connect the drive shaft 7 to the 1-speed driven gear 18a or the 4-speed driven gear 18b. Similarly, dog rings 20b and 20c are arranged between the 3-speed driven gear 18c and the 6-speed driven gear 18d and between the 5-speed driven gear 18e and the 2-speed driven gear 18f, respectively.

As illustrated in FIG. 1, the gearshift unit 22 has a shift fork 24 operated by a shift cam 23, for example, in response to driver's pedaling of a shift pedal arm as known in the art. The shift cam 23 is pivoted stepwise by a predetermined angle, so that the dog rings 19a to 19c and 20a to 20c slide in the axial direction by interposing the shift fork 24 to select one of six combinations between the driving gears 16a to 16f and the driven gears 18a to 18f.

FIG. 2 illustrates a neutral position. In the neutral position, the dog rings 19a to 19c are not engaged with any one of the driving gears 16a to 16f, and the dog rings 20a to 20c are not engaged with any one of the driven gears 18a to 18f.

In the multistage transmission device 5, a gearshift position is, so called, sequentially shifted by a driver or a controller from the neutral position to a 1-speed position, a 2-speed position, a 3-speed position, a 4-speed position, a 5-speed position, and then, a 6-speed position.

A description will now be made for operations of the multistage transmission device 5 when a shift-up operation is performed from the 1-speed position to the 2-speed position.

Figure 3:
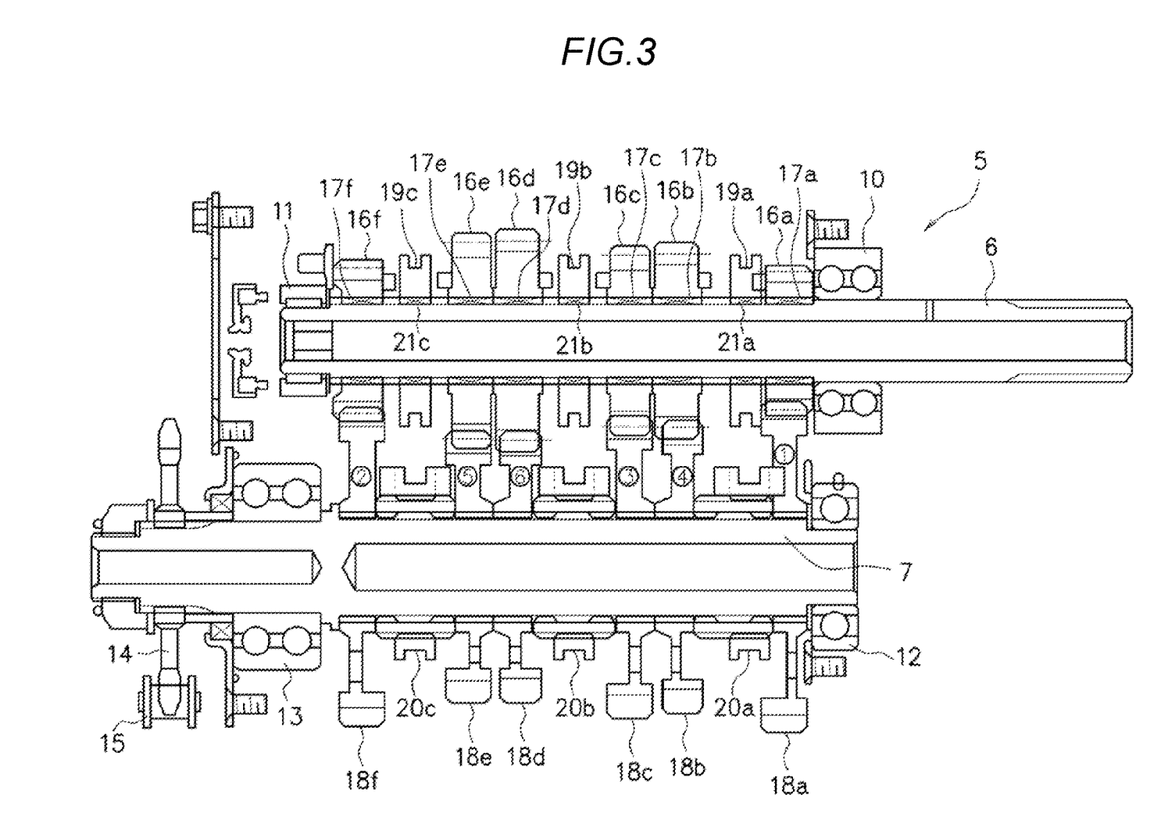
FIG. 3 is a diagram illustrating main parts of the multistage transmission device according to an embodiment of the present invention in a 1-speed position.

FIG. 3 illustrates the 1-speed position. In the 1-speed position, the dog ring 19a is engaged with the 1-speed driving gear 16a, and the dog ring 20a is engaged with the 1-speed driven gear 18a.

In this state, if a vehicle is accelerated, the rotation of the countershaft 6 is transmitted to the drive shaft 7 via the one-way clutch 17a, the 1-speed driving gear 16a, the 1-speed driven gear 18a, and then, the dog ring 20a.

For deceleration, the rotation of the drive shaft 7 is transmitted to the countershaft 6 via the dog ring 20a, the 1-speed driven gear 18a, the 1-speed driving gear 16a, the dog ring 19a, and then, the one-way clutch 21a. As a result, an inverse torque from the driving wheel during deceleration is transmitted from the drive shaft 7 to the countershaft 6 so that a so-called engine brake works.

FIGS. 4A to 4D illustrate a shift-up operation from the 1-speed position to the 2-speed position.

Figure 4A:
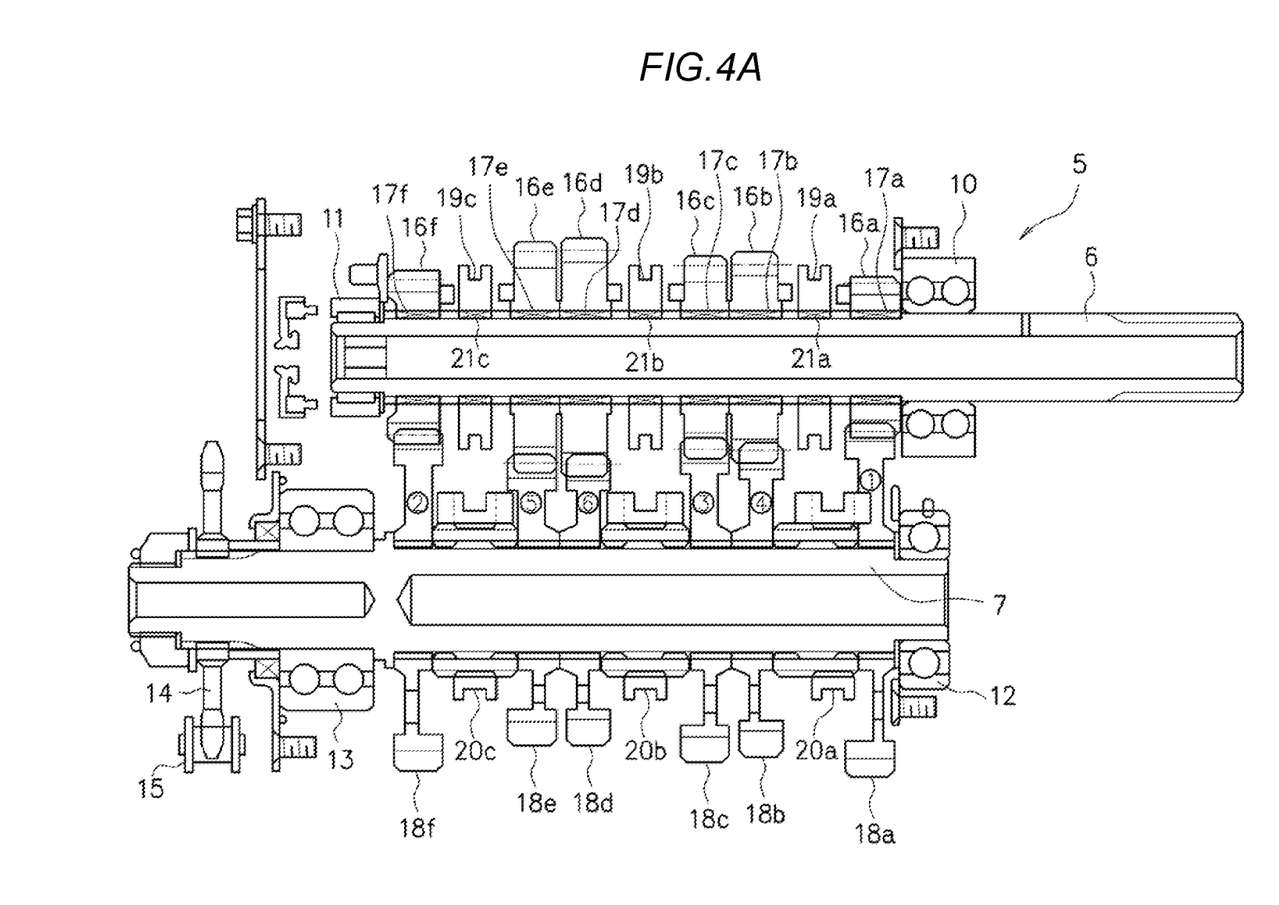
FIG. 4A is a diagram illustrating main parts of the multistage transmission device according to an embodiment of the present invention in the middle of a shift-up operation from the 1-speed position to the 2-speed position.

First, as illustrated in FIG. 4A, the dog ring 19a slides and is disengaged from the 1-speed driving gear 16a to release the connection.

In this state, the rotation of the countershaft 6 is transmitted to the drive shaft 7 via the one-way clutch 17a, the 1-speed driving gear 16a, the 1-speed driven gear 18a, and then, the dog ring 20a.

For deceleration, the rotation of the drive shaft 7 is transmitted to the dog ring 20a, the 1-speed driven gear 18a, and then, the 1-speed driving gear 16a. However, the dog ring 19a is disengaged from the 1-speed driving gear 16a, and the rotation from the 1-speed driving gear 16a to the countershaft 6 is not transmitted by the one-way clutch 17a. Therefore, the 1-speed driving gear 16a slips out of the countershaft 6.

Figure 4B:
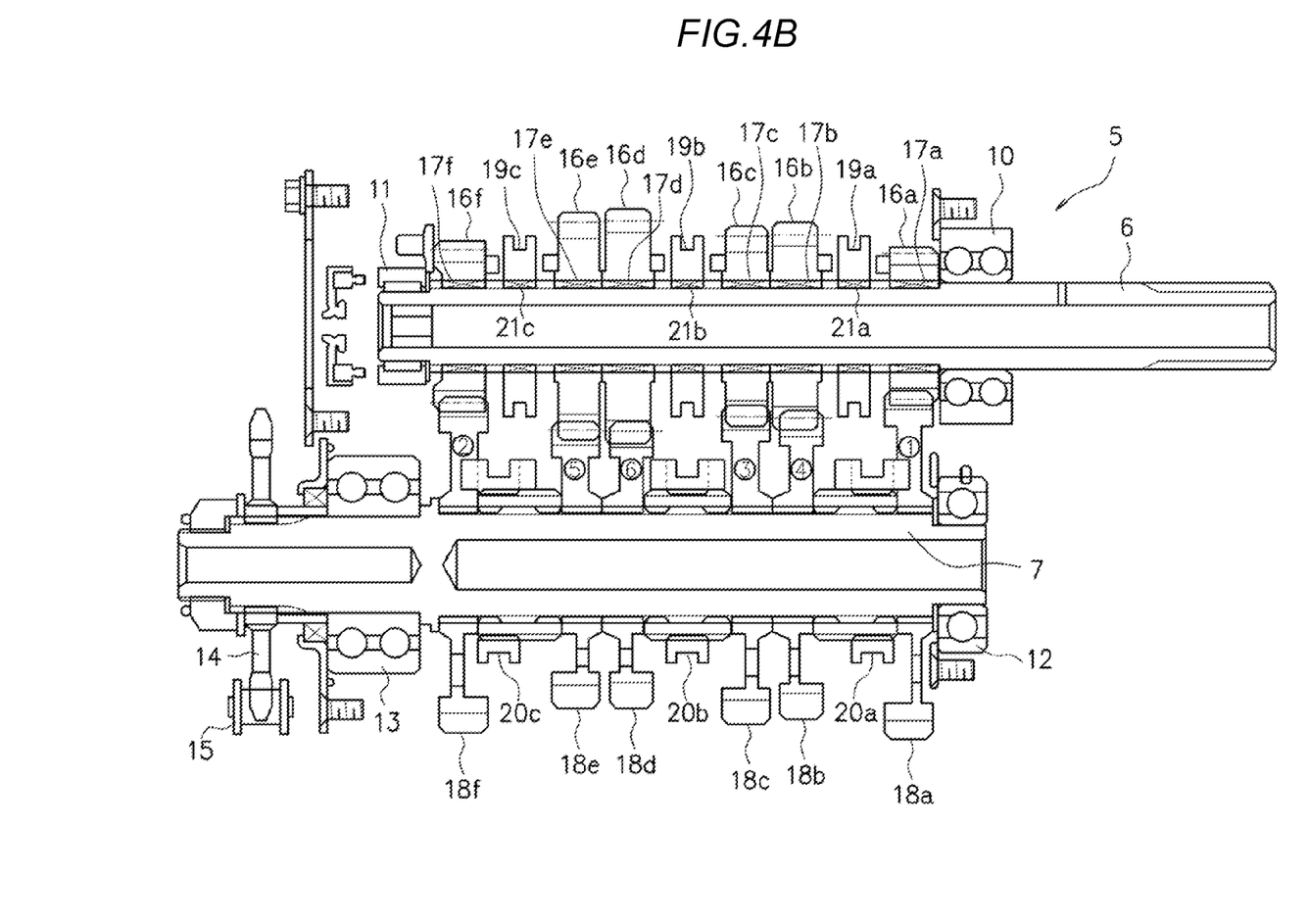
FIG. 4B is a diagram illustrating main parts of the multistage transmission device according to an embodiment of the present invention in the middle of the shift-up operation from the 1-speed position to the 2-speed position.

Then, as illustrated in FIG. 4B, the dog ring 20c slides and is engaged with the 2-speed driven gear 18f.

In this state, the rotation of the countershaft 6 is transmitted to the drive shaft 7 via the one-way clutch 17f, the 2-speed driving gear 16f, the 2-speed driven gear 18f, and then, the dog ring 20c. In this case, the dog ring 20a is still engaged with the 1-speed driven gear 18a. Therefore, the 1-speed driven gear 18a and the 2-speed driven gear 18f are rotated in synchronization with the drive shaft 7. That is, while the 1-speed driving gear 16a and the 2-speed driving gear 16f are rotated in synchronization with the countershaft 6, the 1-speed driving gear 16a turns from the 1-speed driven gear 18a and is rotated faster than the rotation of the countershaft 6. As a result, the 1-speed driving gear 16a slips out of the countershaft 6.

For deceleration, although the rotation of the drive shaft 7 is transmitted to the dog ring 20a, the 1-speed driven gear 18a, and then, the 1-speed driving gear 16a, the dog ring 19a is disengaged from the 1-speed driving gear 16a, and the rotation is not transmitted from the 1-speed driving gear 16a to the countershaft 6 due to the one-way clutch 17a. Therefore, the 1-speed driving gear 16a slips out of the countershaft 6. Similarly, although the rotation of the drive shaft 7 is transmitted to the dog ring 20c, the 2-speed driven gear 18f, and then, the 2-speed driving gear 16f, the dog ring 19c is disengaged from the 2-speed driving gear 16f, and the rotation from the 2-speed driving gear 16f to the countershaft 6 is not transmitted by the one-way clutch 17f. Therefore, the 2-speed driving gear 16f slips out of the countershaft 6.

Figure 4C:
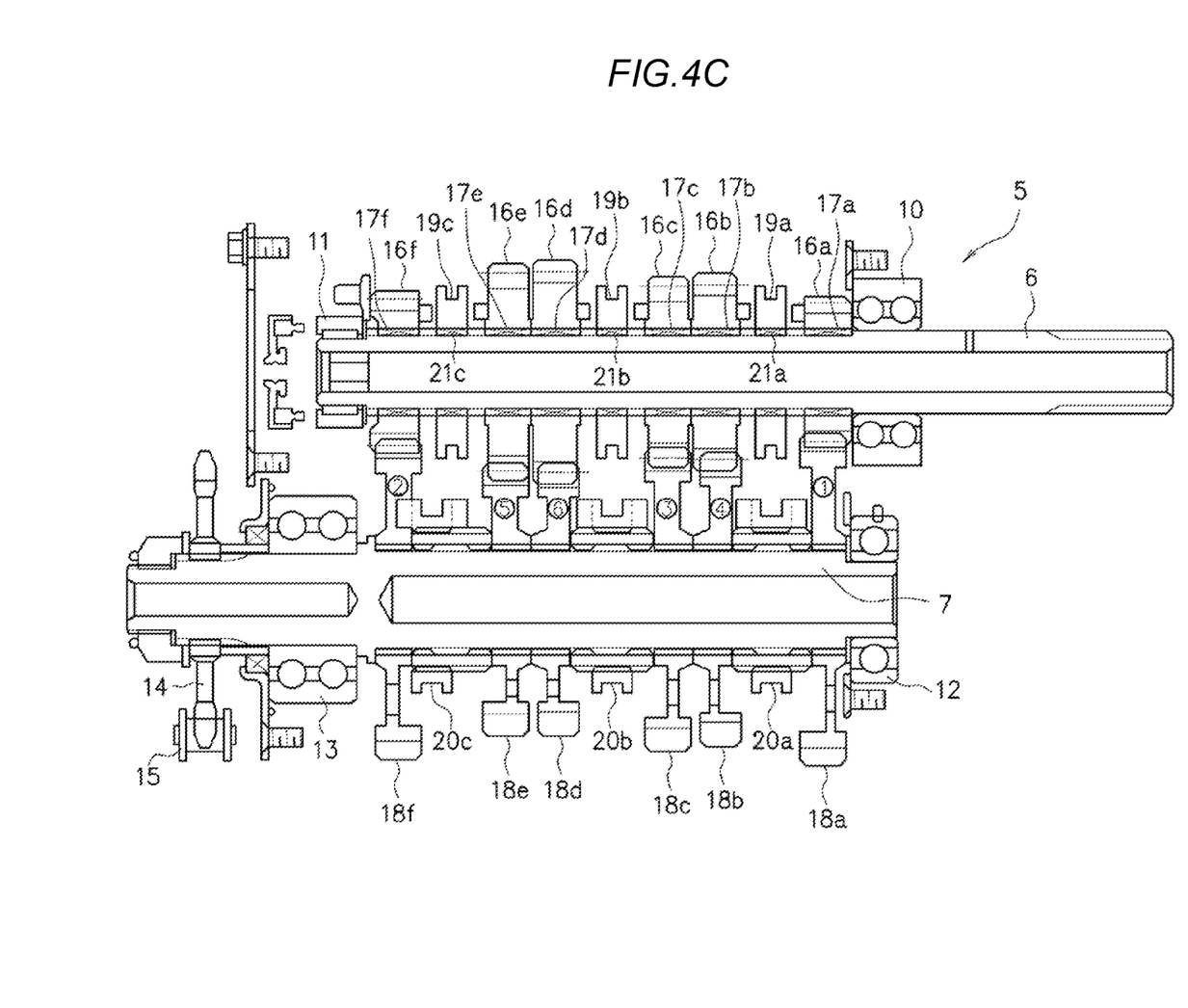
FIG. 4C is a diagram illustrating main parts of the multistage transmission device according to an embodiment of the present invention in the middle of the shift-up operation from the 1-speed position to the 2-speed position.

Then, as illustrated in FIG. 4C, the dog ring 20a slides and is disengaged from the 1-speed driving gear 18a to release the connection.

Figure 4D:
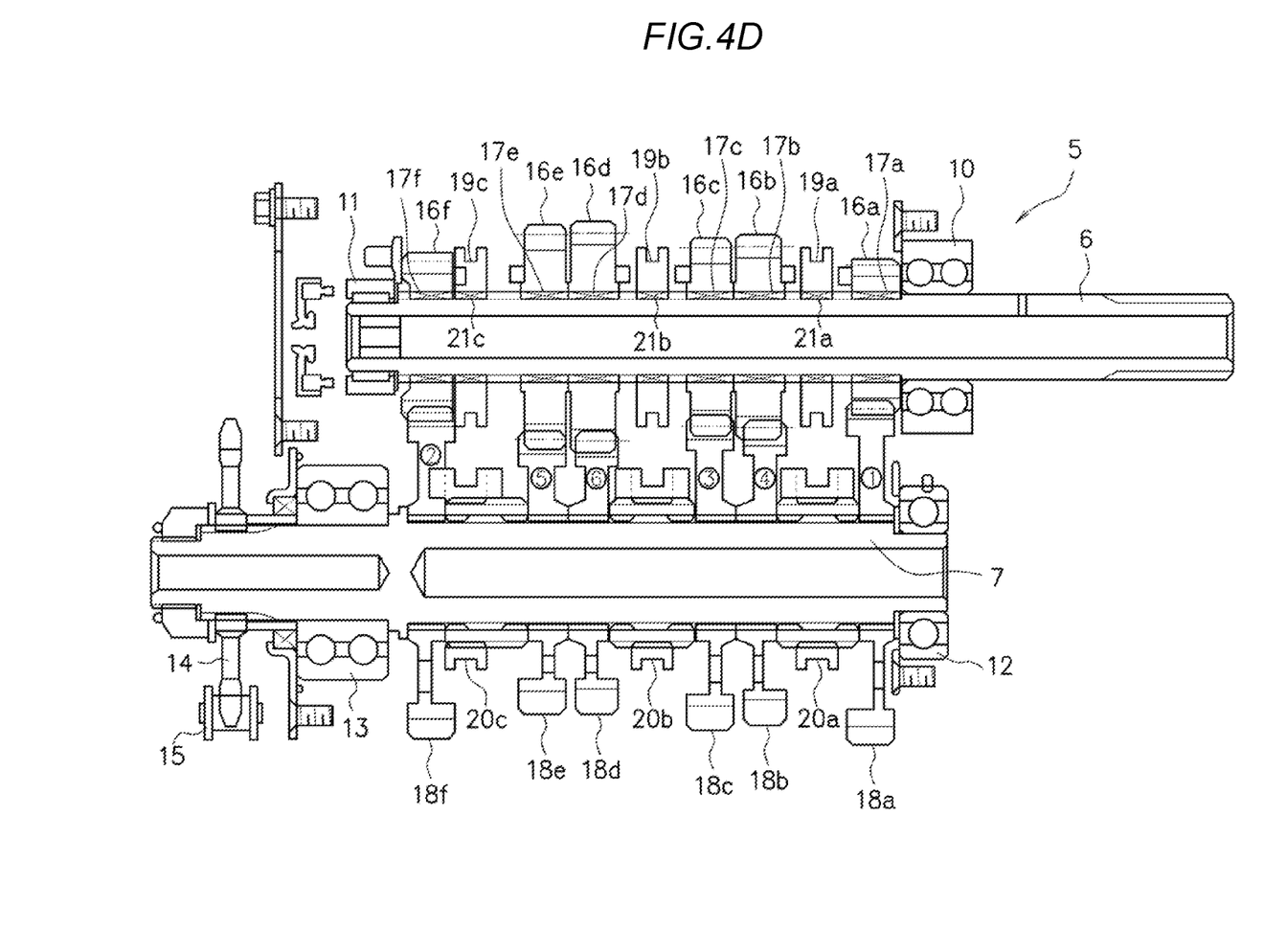
FIG. 4D is a diagram illustrating main parts of the multistage transmission device according to an embodiment of the present invention in the 2-speed position.

Then, as illustrated in FIG. 4D, the dog ring 19c slides and is engaged with the 2-speed driving gear 16f, so that the shift-up operation to the 2-speed position is completed. In the 2-speed position, the dog ring 19c is engaged with the 2-speed driving gear 16f, and the dog ring 20c is engaged with the 2-speed driven gear 18f.

In this state, for acceleration, the rotation of the countershaft 6 is transmitted to the drive shaft 7 via the one-way clutch 17f, the 2-speed driving gear 16f, the 2-speed driven gear 18f, and then, the dog ring 20c.

For deceleration, the rotation of the drive shaft 7 is transmitted to the countershaft 6 via the dog ring 20c, the 1-speed driven gear 18f, the 1-speed driving gear 16f, the dog ring 19c, and then, the one-way clutch 21c. As a result, an inverse torque generated from the driving wheel during deceleration is transmitted from the drive shaft 7 to the countershaft 6, so that a so-called engine brake works.

Figure 5:
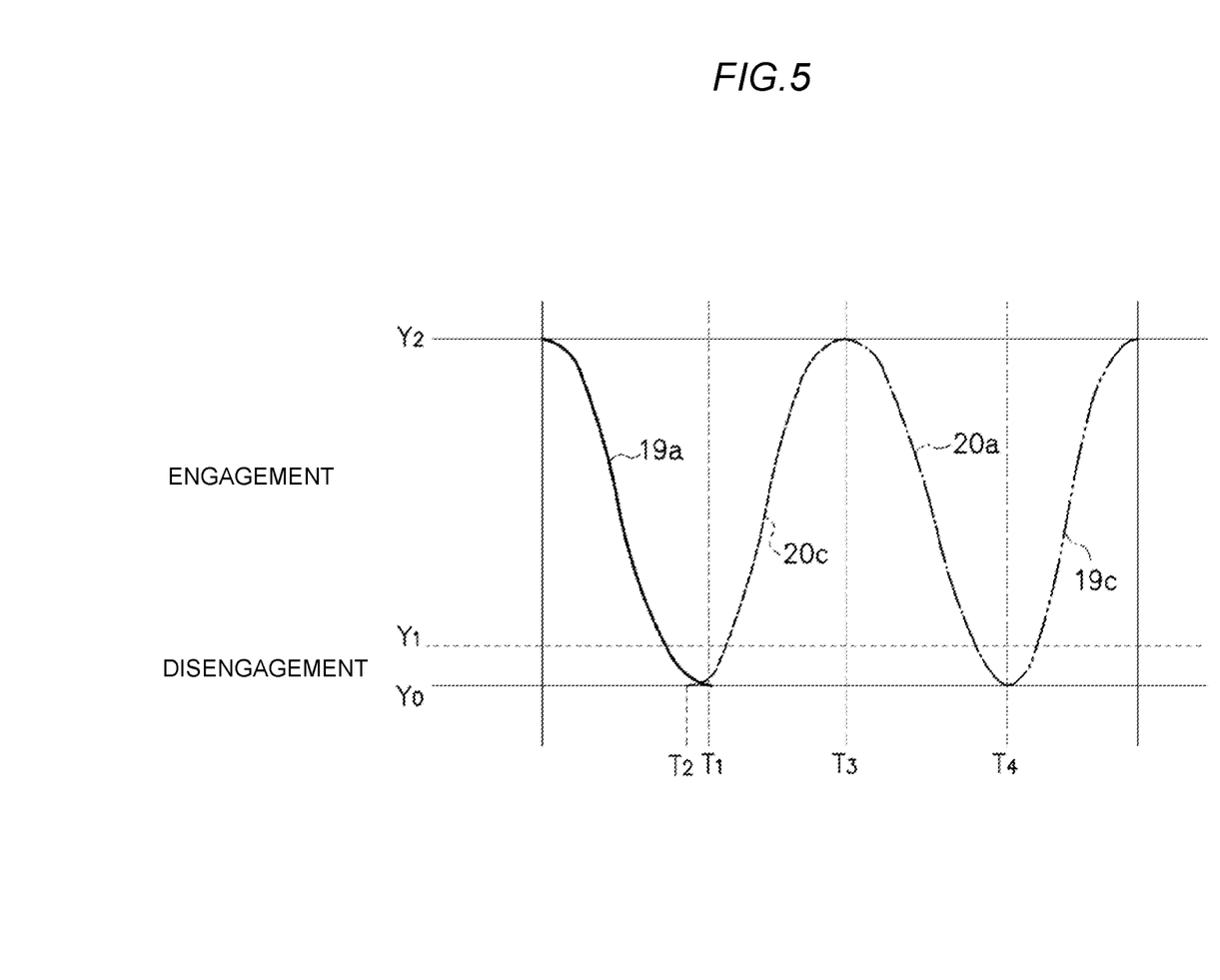
FIG. 5 is a timing chart illustrating an exemplary state transition of a dog ring in the shift-up operation from the 1-speed position to the 2-speed position.

FIG. 5 is a timing chart illustrating an exemplary state transition of the dog rings 19a, 19c, 20a, and 20c in the shift-up operation from the 1-speed position to the 2-speed position. The ordinate denotes engagement/disengagement states of the dog rings 19a, 19c, 20a, and 20c, and the abscissa denotes time. The level "$Y_0$" refers to a state that disengagement from the gear is completed. The level "$Y_2$" denotes a state that engagement to the gear is completed. Since there is a gap in the axial direction between the dog ring and the gear, it takes time until the dog ring is engaged with or disengaged from the gear after the dog ring slides. Therefore, the level "$Y_1$" serves as a boundary for determining the engagement or disengagement state.

As illustrated in FIG. 5, first, the dog ring 19a slides and is disengaged from the 1-speed driving gear 16a to release the connection (refer to FIG. 4A).

As the dog ring 19a is disengaged from the 1-speed driving gear 16a, the dog ring 20c starts to slide and is engaged with the 2-speed driven gear 18f (refer to FIG. 4B). In this example, the dog ring 20c starts to slide at the timing $T_2$ before the timing $T_1$ at which the dog ring 19a completes disengagement from the 1-speed driving gear 16a.

As soon as the dog ring 20c completes engagement with the 2-speed driven gear 18f (at the timing $T_3$), the dog ring 20a starts to slide and is disengaged from the 1-speed driven gear 18a (refer to FIG. 4C).

As the dog ring 20a is disengaged from the 1-speed driven gear 18a, the dog ring 19c starts to slide and is engaged with the 2-speed driving gear 16f (refer to FIG. 4D). In this example, the dog ring 19c starts to slide at the timing $T_4$ where the dog ring 20a completes disengagement from the 1-speed driven gear 18a. However, the dog ring 19c may start to slide at any timing earlier than the timing $T_4$.

It is noted that the state transition of FIG. 5 is just for illustrative purposes, and the invention is not limited thereby. For example, the dog ring 20a starts to slide for disengagement at any timing earlier than the timing $T_3$. Accordingly, it is possible to expedite the timing at which the dog ring 19c starts to slide for engagement. Therefore, it is possible to reduce the time taken for the shift-up operation.

Herein, a shift-up operation from the 1-speed position to the 2-speed position has been described as an example of the shift-up operation for shifting a gearshift stage having a larger gear reduction ratio (hereinafter, referred to as a "lower stage") to a gearshift stage having a smaller gear reduction ratio (hereinafter, referred to as a "higher stage"). However, the aforementioned technical concept may similarly apply to a shift-up operation from the 2-speed position to the 3-speed position, a shift-up operation from the 3-speed position to the 4-speed position, a shift-up operation from the 4-speed position to the 5-speed position, and a shift-up operation from the 5-speed position to the 6-speed position.

The one-way clutches 17a to 17f are arranged between the countershaft 6 and the driving gears 16a to 16f as described above. Therefore, in order to perform the shift-up operation from the lower stage to the higher stage (for example, from the 1-speed position to the 2-peed position), the input from the driving gear is transmitted only from the lower stage to the higher stage (1-speed position→2-speed position) while the dog ring 20a is engaged with the 1-speed driven gear 18a, and the dog ring 20c is engaged with the 2-speed driven gear 18f. Therefore, in comparison with the structure in which "the dog ring is transitioned to the 2-speed position after it is disengaged from the 1-speed driven gear," it is possible to prevent a stoppage of the drive force during the corresponding operation. As a result, it is possible to implement a seamless shift-up operation by omitting a clutch operation with a simple structure without complicating an internal structure of the countershaft 6 or the drive shaft 7.

While various embodiments of the invention have been described and illustrated, they are not intended to limit the scope of the present invention, and various changes and modifications may be possible without departing from the spirit and scope of the invention.

According to the present invention, it is possible to implement a seamless shift-up operation and achieve a smooth speed-up operation by using a simple structure without complicating an internal structure of the shaft.

What is claimed is:

1. A multistage transmission device comprising:
   a countershaft configured to receive a drive force;
   a drive shaft configured to output the drive force received from the countershaft;
   a plurality of driving gears provided on the countershaft;
   a plurality of countershaft-side transmission members configured to switch at least one of mechanical connection and disconnection between the countershaft and each of the driving gears;
   a plurality of driven gears respectively meshing with the plurality of driving gears, the driven gears being configured to be rotatable independent of the drive shaft;
   a plurality of drive shaft-side transmission members configured to switch mechanical connection or disconnection between the drive shaft and the driven gears;
   a plurality of one-way clutches arranged between the countershaft and all of the driving gears to transmit rotation of the countershaft to the driving gear when the rotation of the countershaft is faster than rotation of the driving gear; and
   a plurality of one-way clutches arranged between the countershaft and all of the countershaft-side transmission members to transmit rotation of the countershaft-side transmission members to the countershaft when the rotation of the countershaft-side transmission members are faster than the rotation of the countershaft.

2. The multistage transmission device according to claim 1, wherein, in order to perform a shift-up operation from a gearshift stage having a larger gear reduction ratio to a gearshift stage having a smaller gear reduction ratio, at least one of the drive shaft-side transmission members temporarily has a state that the drive shaft is connected to a driven gear having a smaller gear reduction ration while the drive shaft is connected to a driven gear having a larger gear reduction ratio.

* * * * *